United States Patent [19]
Speicher et al.

[11] Patent Number: 4,892,253
[45] Date of Patent: Jan. 9, 1990

[54] YOKE NOZZLE ACTUATION SYSTEM

[75] Inventors: John M. Speicher; Allan A. Voigt, both of Geyserville, Calif.

[73] Assignee: Versatron Corporation, Healdsburg, Calif.

[21] Appl. No.: 232,022

[22] Filed: Aug. 15, 1988

[51] Int. Cl.⁴ .................................................. F02K 9/84
[52] U.S. Cl. .................................. 239/265.35; 60/232
[58] Field of Search .................... 239/265.35; 60/228, 60/232

[56] References Cited

U.S. PATENT DOCUMENTS

| | | | |
|---|---|---|---|
| 2,704,331 | 3/1955 | Stott et al. | 74/55 |
| 2,850,977 | 9/1958 | Pollak | 744/3.22 |
| 2,919,544 | 1/1960 | Smith, Jr. et al. | 239/265.35 |
| 3,073,630 | 1/1963 | Kuhn, Jr. | 403/57 |
| 3,142,153 | 7/1964 | Hensley | 60/232 |
| 3,147,591 | 9/1964 | McEwen | 239/265.35 |
| 3,188,024 | 6/1965 | Schneider | 239/265.35 |
| 3,200,587 | 8/1965 | Tolson | 60/232 |
| 3,237,890 | 3/1966 | Thielman | 239/265.35 |
| 3,659,423 | 5/1972 | Lair et al. | 60/232 |
| 3,908,908 | 9/1975 | Johnson | 239/265.35 |
| 4,281,795 | 8/1981 | Schweikl | 239/265.35 |
| 4,350,297 | 9/1982 | Martin | 239/265.35 |

FOREIGN PATENT DOCUMENTS 2113628  8/1963  United Kingdom ........... 239/265.35

*Primary Examiner*—Andres Kashnikow
*Assistant Examiner*—Karen B. Merritt
*Attorney, Agent, or Firm*—Henry M. Bissell

[57] ABSTRACT

An actuation system for controlling the steerable nozzle of a missile or like vehicle. The system comprises two essentially identical actuators mounted along a plane generally transverse to the missile axis and oriented orthogonally relative to each other about the missile axis for pivoting the nozzle through mutually orthogonal axes, thereby achieving omni-directional steering. Each actuator includes an elongated yoke plate extending about the nozzle for applying steering forces against a yoke seat circumferentially mounted on the nozzle. Each yoke plate is pivotably mounted at one end and driven laterally at the other end by a gearing mechanism affixed to the nozzle skin.

23 Claims, 3 Drawing Sheets

YOKE NOZZLE ACTUATION SYSTEM

BACKGROUND OF THE INVENTION

1. Field of the Invention

This invention relates to rocket vehicles and, more particularly, to arrangements for steering such vehicles by controlling thrust direction.

2. Description of Related Art

As military aircraft become faster and more maneuverable, there is increased need for faster and more maneuverable missiles with longer ranges to counter these threats. One method of increasing maneuverability of a missile is to use a steerable nozzle on the rocket motor to allow the direction of thrust to be controlled. This affords greater maneuverability than traditional movable aerodynamic fins alone can provide under low speed or very high altitude conditions when the dynamic pressure is low. The mechanism used to move the steerable nozzle is known as the nozzle actuator system. The nozzle actuator system usually is located around the nozzle and infringes on the volume one would like to fill with rocket fuel. If the overall dimensions of the rocket motor are fixed, the smaller the nozzle actuator, the more room remains for fuel. Thus, smaller nozzle actuators give the missile greater range.

Nozzle actuators and similar steering systems have been built based on hydraulic, pneumatic and electromechanical control systems. For example, Pollak in U.S. Pat. No. 2,850,977 discloses a gimballed power plant in a jet propelled aircraft in which exhaust gases from the rocket propulsion motor are utilized to adjust the rocket motor axis relative to the flight axis of the aircraft by having gyro-operated rotatable fins positioned in the exhaust gas stream. Adjustment of these fins by the aerodynamic forces impinging on them causes movement of the propulsion motor relative to the vehicle axis.

The Tolson U.S. Pat. No. 3,200,587 describes a number of structural arrangements for shifting a rocket engine exhaust nozzle to shift the thrust axis from a position coincidental with the central axis of the vehicle to various positions where it is laterally displaced from the central axis. Movement of the thrust or vehicle axis applies torque to axis from the center of gravity the vehicle to effect directional change.

The Kuhn, Jr. U.S. Pat. No. 3,073,630 discloses a particular design of rocket engine gimbal which is provided to control the body, thrust direction of a rocket engine, relative to a missile by pivoting the exhaust nozzle in the gimbal.

Other schemes using steerable propulsion systems for exhaust jet propulsion systems are disclosed in U.S. Pat. Nos. 3,237,890 of Thielman, 2,919,544 of Smith, Jr. et al, 3,908,908 of Johnson and 3,188,024 of Schneider.

In the development of modern nozzle actuators for controlling steerable exhaust nozzles, electromechanical systems have become dominant because of their improved effectiveness, reliability and reduced weight. Electromechanical nozzle actuators conventionally involve motors and some type of speed reducer to transform the high speed, low torque motor motion into high torque, low speed nozzle motion. This has been accomplished in the past with ball screws or gear reducers and four-bar type linkages. Previously known speed reducers have been bulky and heavy, and thus present certain inherent limitations. Known prior art designs do not present the advantages of the arrangements in accordance with the present invention which are shorter, lighter, easier to fabricate, and better adapted for greater maneuverability of missiles and the like.

SUMMARY OF THE INVENTION

In brief, nozzle actuation systems in accordance with the present invention comprise two conceptually identical nozzle actuators mounted for independently controlling nozzle movement in two orthogonal planes intersecting the central axis of the rocket motor. Each actuator mechanism comprises an elongated yoke plate having an elongated central opening through which the movable nozzle extends. One end of the yoke plate is anchored to the missile skin or frame via a pivot mounting. The opposite end of the yoke plate is formed with a plurality of gear teeth in a sector gear arrangement engaging the gear teeth of the shaft of a geared motor drive which is also anchored to the missile skin or frame at approximately 180 degrees from the pivot anchor of the yoke plate. A corresponding nozzle actuator mechanism is mounted adjacent to the first actuator oriented at 90 degrees to the first nozzle actuator apparatus. The movable rocket nozzle is pivotably attached to the rocket motor by a ball and socket arrangement. The exhaust nozzle is provided with a spherical segment yoke seat for surface contact with the respective yoke plates. This yoke seat is fashioned as a circumferential enlargement of the movable nozzle and may be machined out of the nozzle or threadably attached or otherwise affixed by suitable means. This arrangement affords a slidable, essentially point contact with the four driving surfaces of the two yoke plates surrounding the nozzle yoke seat.

BRIEF DESCRIPTION OF THE DRAWINGS

A better understanding of the present invention may be realized from a consideration of the following detailed description, taken in conjunction with the accompanying drawing in which.

DESCRIPTION OF THE PREFERRED EMBODIMENT

Figure 1:
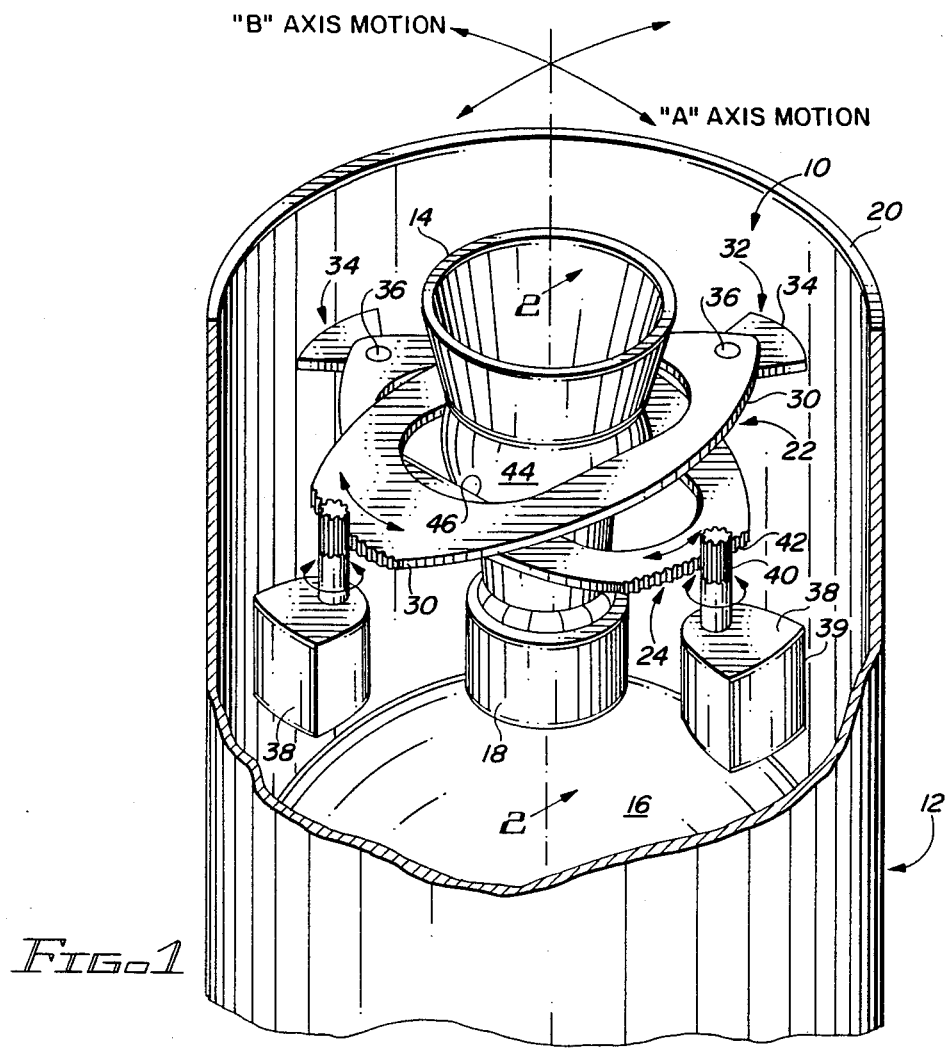
FIG. 1 is a schematic perspective view, partially broken away, illustrating one particular arrangement in accordance with the present invention.

As shown particularly in the schematic view of FIG. 1, the nozzle actuation system 10 is shown in conjunction with a missile having a steerable nozzle 14 mounted to a rocket motor 16 via a ball and socket joint 18, and an encompassing skin 20 which is partially broken away to show details of the steering arrangement of the present invention. The nozzle actuation system 10 comprises a pair of nozzle actuators 22, 24 which are oriented orthogonally from each other in adjacent planes which are generally transverse to the missile central axis to effect steering of the nozzle 14 relative to two orthogonal "A" and "B" axes, respectively. Thus, the actuator system 10 is able to drive the nozzle 14 about the two orthogonal axes A and B for omni-directional steering.

Each of the individual actuators 22, 24 includes a yoke plate 30 and anchoring means at opposite ends of the yoke plate for anchoring the actuator to the missile skin 20. At one end of each yoke plate 30, the anchoring assembly 32 comprises an anchor 34 which is affixed to the inner surface of the skin 20 and serves as a pivotable mount for the yoke plate 30 via a pivot pin 36.

At the opposite end of each yoke plate 30, the anchoring arrangement comprises a gear motor 38 contained in a housing 39 which is affixed to the inner surface of the skin 20. Projecting from the housing 39 is a geared shaft 40 which is adapted to engage the adjacent end of the yoke 30 which is fashioned with gear teeth comprising part of a sector gear 42.

Completing the actuation system 10 of FIG. 1 is a yoke seat the elliptical openings of the elongated yoke plates 30. The yoke seat 44 is formed as a segment of a sphere to provide sliding contact points, such as at 46, to support the bearing loads generated by the yoke plates 30. The seat 44 is spherically cut and has a center on the nozzle center line at a point approximately in line with the central plane between the two yoke plates 30.

Each yoke plate has an elongated central opening defined by two arms which extend about the nozzle. These arms have bearing surfaces adjacent the nozzle yoke seat for transmitting lateral forces to the nozzle 14 while permitting sliding contact with the yoke seat 44.

Figure 2:
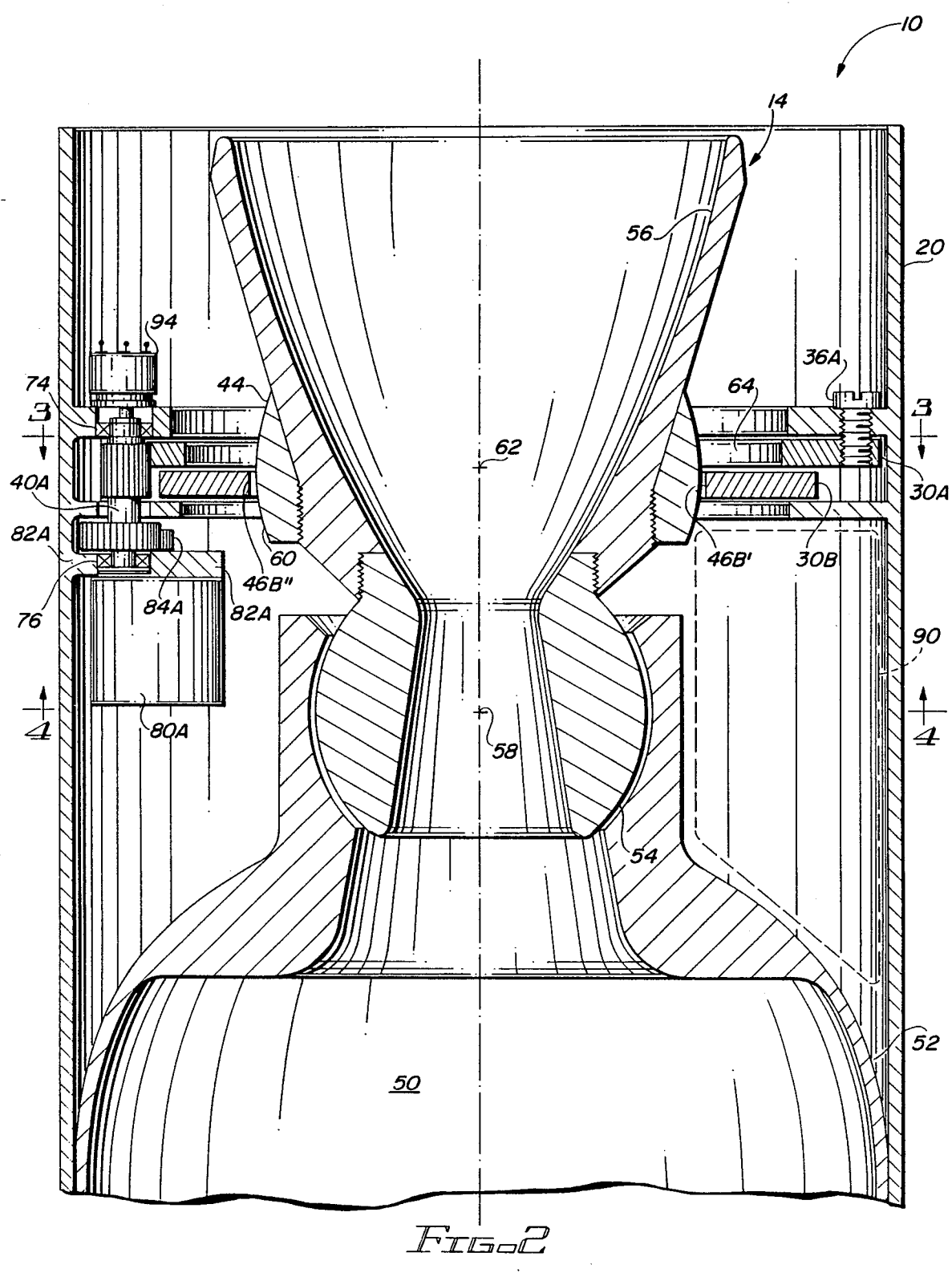
FIG. 2 is a side sectional view of the arrangement of FIG. 1, taken along line 2—2 thereof and showing certain structural details.
Figure 3:
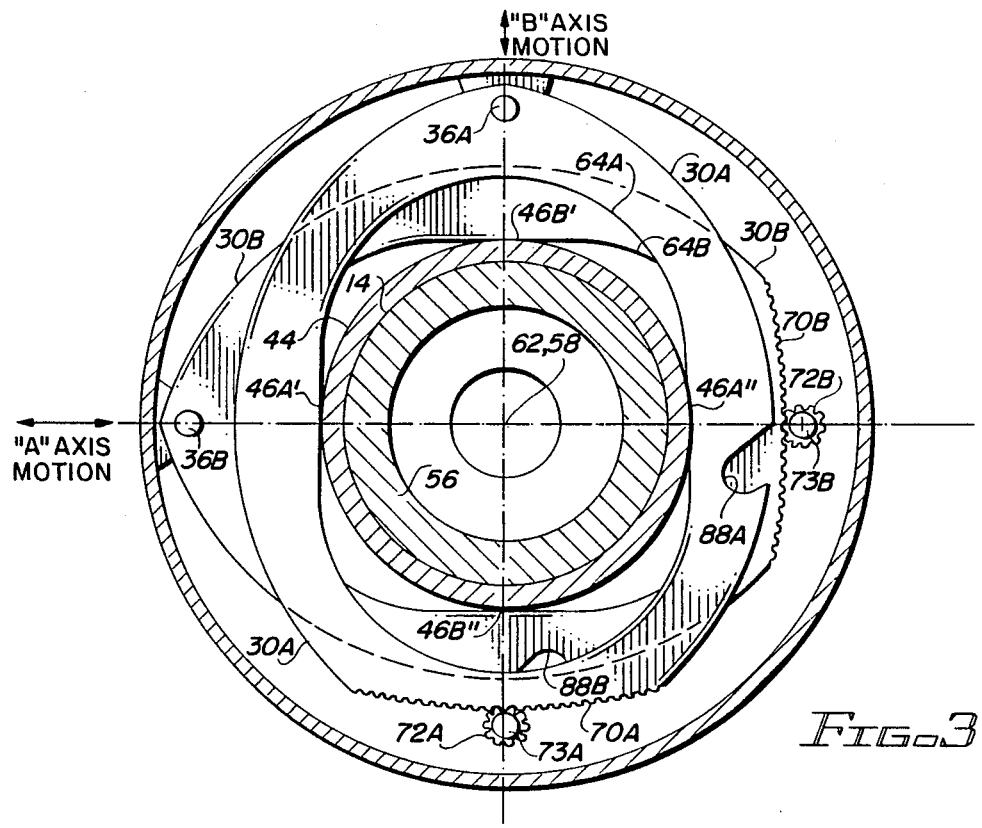
FIG. 3 is a cross sectional view taken along line 3—3 of FIG. 2.
Figure 4:
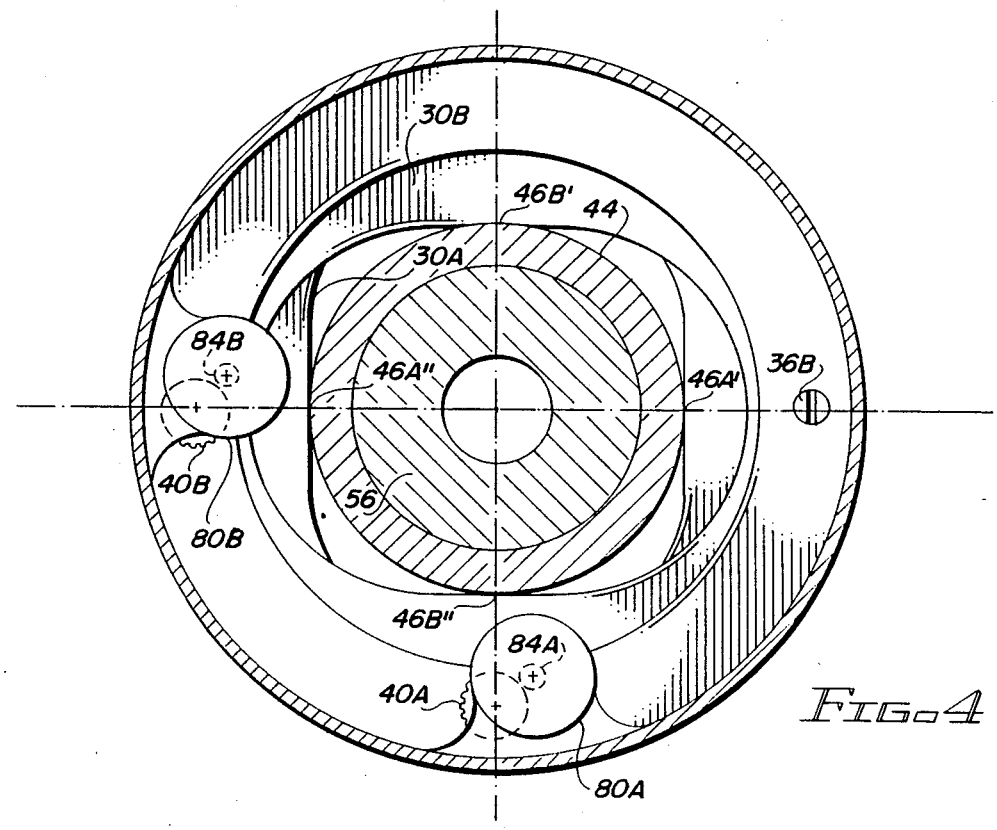
FIG. 4 is a cross sectional view taken along line 4—4 of FIG. 2.

FIGS. 2-4 illustrate particular structural details of the preferred embodiment of the nozzle system 10. A generic rocket motor is pictured having a pressure vessel volume 50 and an aft closure 52 which contains the socket for a spherical ball and socket pivot 54. The nozzle exit cone 56 of nozzle 14 is attached to the ball portion of the pivot 54 such that the exit cone 56 is constrained to rotate with three degrees of freedom about a point 58 in the center of the ball and socket pivot 54.

The spherically cut surface 60 of yoke seat 44 is threadably mounted to the outside of the nozzle 14. The surface 60 affords a suitably strong seat for contact with the two yoke plates 30A, 30B at four points. Two of these points are indicated at 46B' and 46B" in FIG. 2 for the yoke plate 30B. The yoke seat 44 is spherically cut about a point 62 located along the center line of the exit cone 56 and nominally on a plane midway between the two yoke plates 30A, 30B. Forces transmitted through the points of contact between the yoke plates 30A and 30B and the yoke seat 44 generate torque which drives rotation of the nozzle 14 about the A and B axes.

The A-axis actuator 34 comprises yoke plate 30A which is attached to the missile skin structure 20 through a pivot pin 36A. The yoke plates 30A, 30B are constrained to move in planes about their respective pivot pins 36 by the surrounding structure—i.e., the skin structure 20 fore and aft—as they are driven by the gear motor arrangement 38. Each yoke plate 30A, 30B contains an elongated slot 64A or 64B. The yoke seat 44 lies within the slots 64A, 64B and makes contact at two points on opposite sides of each of the yoke plates 30A, 30B. The slots 64A, 64B and seat 44 are cut for a slight clearance, so that the yoke plates 30A, 30B are not actually in contact with the seat at both contact points at the same time, but rather will contact one point or the other depending upon the direction of applied forces. Each yoke plate 30A, 30B has gear teeth 70A or 70B cut into the plate at one end to establish a sector gear portion which is driven by a cluster shaft pinion 72. The cluster shaft is mounted by bearings 74, 76 to the missile skin structure 20. The A-axis drive motor 80A is mounted on tabs 82A of the missile skin structure 20. The motor shaft pinion 84A drives the cluster shaft 40A. Clearance slots 88 are cut into the yoke plates 30A, 30B to allow long rotation of the yoke plates without interference from the other axes cluster pinions 72.

The B-axis drive is essentially identical to the A-axis drive. The B-axis yoke plate 30B is positioned next to, but in front of, the A-axis yoke plate 30A. Its pivot pin 36B is similarly attached to the missile structure 20, and yoke plate 30B has sector gear teeth 70B driven by an engaged pinion 72B on shaft 73B.

The actuator mechanism of the present invention leaves a large toroidal volume 90 available for the electronics and battery elements necessary to drive the motors and close the servo loops. In the preferred embodiment, each actuator is driven as part of a closed servo loop. Potentiometers mounted on extensions of the cluster shafts 40, such as the potentiometer 94 shown in FIG. 2 for the A-axis actuator, provide feedback to close the servo loops.

Figure 5:
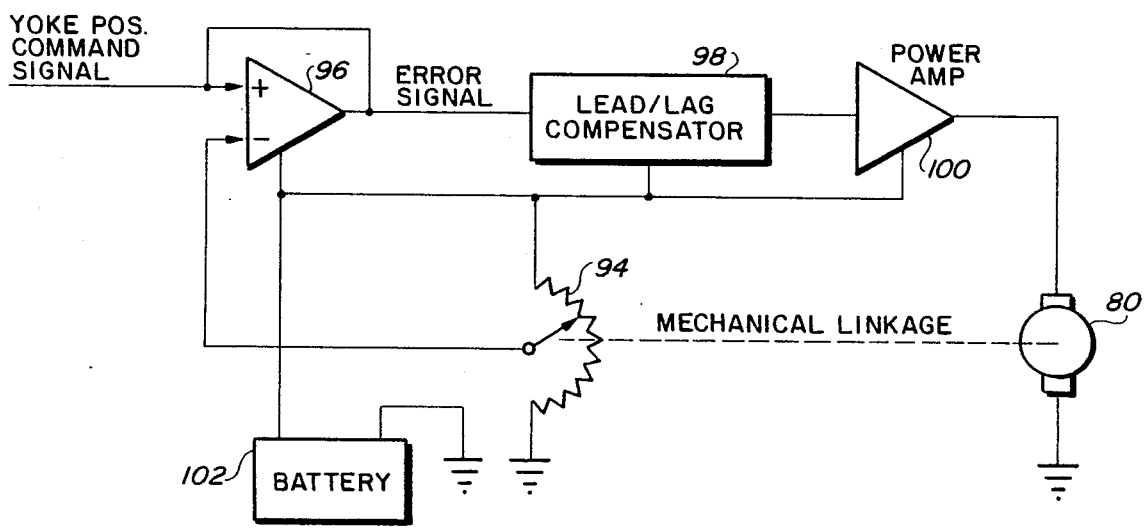
FIG. 5 is a schematic block diagram of an electrical circuit for controlling the drive arrangement of the present invention.

A schematic block diagram of a typical servo control loop is shown in FIG. 5. This is shown comprising a potentiometer 94, a summing stage 96, error signal compensator 98 and power amplifier 100 connected to drive a brushless DC motor 80. Battery power for the circuit is supplied from a battery 102.

In this circuit, a yoke position command signal is applied as one input of the summer stage 96. This is summed with the feedback voltage from potentiometer 94 to create an output error signal. The error signal is compensated in the lead/lag compensator stage 98 to improve system stability, and is then fed to the power amplifier 100. The output of the amplifier 100 is applied to the motor 80 to move the nozzle.

Arrangements in accordance with the present invention advantageously provide for the directional control of a missile driven or directed by a pivotable nozzle. Embodiments of the invention are effective in systems utilizing a nozzle mount which allows motion closely approximating the rotation about a point which is provided by the ball and socket mounting shown in the drawings. For example, a flex seal nozzle may be used effectively in place of the ball and socket mount which is depicted. The system is light in weight, as such nozzle steering systems go, consists of only a few moving parts, is economical to manufacture, requires limited additional space for the system components, and is effective and reliable in operation. By arranging for control of steering in varying selected degrees through two orthogonal axes, omni-directional steering of the nozzle is achieved. Systems in accordance with the present invention may be used in lieu of or in combination with other steering systems, such as, for example, missile steering systems having aerodynamic fin steering. Because arrangements of the present invention comprise closed loop servo mechanisms, the control circuitry may be readily combined with other steering control circuitry such as that employed for providing aerodynamic fin steering.

Although there have been shown and described hereinabove specific arrangements of a yoke nozzle actuation system in accordance with the invention for the purpose of illustrating the manner in which the invention may be used to advantage, it will be appreciated that the invention is not limited thereto. For example, the amplifier/motor combination of FIG. 5 may employ a brushless DC, induction, stepper or other motor. Instead of the feedback potentiometer, some other type of position feedback device such as an encoder, resolver, synchro or rotary variable differential transformer (RVDT) may be used. The gear system may employ a different number of gear reduction stages and can use a planetary gear arrangement if desired. Accordingly, any and all modifications, variations, or equivalent arrangements which may occur to those skilled in the art should be considered to be within the scope of the invention as defined in the annexed claims.

What is claimed is:

1. A nozzle actuator for controlling the thrust angle of a rocket nozzle used to propel a vehicle comprising:
   a vehicle frame support member;
   a steerable nozzle mounted to propel the vehicle;
   a yoke plate having a bearing surface for contacting the nozzle along one side to transmit force thereto;
   means for pivotably mounting the yoke plate to said support member; and
   means for pivoting the yoke plate about said mounting means so as to direct force through the bearing surface to change the thrust angle of the nozzle.

2. The actuator of claim 1 wherein the pivotably mounting means comprises a mounting pin providing pivoted movement of the yoke plate in a plane which is generally transverse to the central axis of the nozzle.

3. The actuator of claim 2 wherein said yoke plate has an elongated central opening defined by a pair of arms on opposite sides of the nozzle, each of said arms having a bearing surface for contacting the nozzle on opposite sides to direct the nozzle in opposing directions along a first axis generally orthogonal to the direction of said arms.

4. The actuator of claim 3 wherein said bearing surfaces are effective to permit sliding movement of the nozzle along said surfaces in a direction parallel to said arms.

5. The actuator of claim 4 wherein said yoke plate pivoting means comprise drive means affixed to the vehicle frame support member in a position approximately 180 degrees from the yoke plate mounting means.

6. The actuator of claim 5 wherein said drive means comprise a motor having a shaft extending therefrom, and means coupling the motor shaft to the yoke plate in driving relationship.

7. The actuator of claim 6 wherein the coupling means comprise a plurality of first gear teeth arranged along a portion of the yoke plate in a gear sector and a pinion gear coupled to rotate with the motor shaft in engagement with said gear sector.

8. The actuator of claim 7 further including a cluster gear arrangement mounted between the motor shaft and the gear sector for transmitting torque from the motor shaft to the yoke plate.

9. The actuator of claim 4 further including a yoke seat extending about said nozzle between the bearing surfaces of the yoke plate and having an exterior surface in the shape of a spherical segment for contacting said bearing surfaces in sliding relationship.

10. A nozzle actuator system for controlling the thrust angle of a rocket nozzle used to propel a vehicle, said system comprising first and second nozzle actuators, each comprising a combination as defined in claim 1, said first and second actuators being oriented orthogonally to each other about the central axis of the nozzle to achieve omni-directional control of the nozzle.

11. The system of claim 10 wherein said first and second actuators are mounted adjacent one another for movement in planes generally transverse to the central axis of the vehicle.

12. The system of claim 10 where in each actuator the pivotably mounting means comprises a mounting pin providing pivoted movement of the yoke plate in a plane which is generally transverse to the central axis of the nozzle.

13. The system of claim 12 where in each actuator said yoke plate has an elongated central opening defined by a pair of arms on opposite sides of the nozzle, each of said arms having a bearing surface for contacting the nozzle on opposite sides to direct the nozzle in opposing directions along an axis generally orthogonal to the direction of said arms.

14. The system of claim 13 where in each actuator said bearing surfaces are effective to permit sliding movement of the nozzle along said surfaces in a direction parallel to said arms.

15. The system of claim 14 where in each actuator said yoke plate pivoting means comprise drive means affixed to the vehicle frame support member in a position approximately 180 degrees from the yoke plate mounting means.

16. The system of claim 15 where in each actuator said drive means comprise a motor having a shaft extending therefrom, and means coupling the motor shaft to the yoke plate in driving relationship.

17. The system of claim 16 where in each actuator the coupling means comprise a plurality of first gear teeth arranged along a portion of the yoke plate in a gear sector and a pinion gear coupled to rotate with the motor shaft in engagement with said gear sector.

18. The system of claim 17 wherein each actuator coupling means further include a cluster gear arrangement mounted between the motor shaft and the gear sector for transmitting torque from the motor shaft to the yoke plate.

19. The system of claim 14 further including a yoke seat extending about said nozzle between the bearing surfaces of the two yoke plates and having an exterior surface in the shape of a spherical segment for contacting said bearing surfaces in sliding relationship.

20. The system of claim 16 further including electromechanical drive control circuitry coupled to drive the motors of each actuator to direct the nozzle to a selected thrust angle.

21. The system of claim 20 wherein said circuitry includes servomechanism feedback for driving said motors to said selected position corresponding to a command signal.

22. The system of claim 21 wherein said servomechanism feedback comprises angular position transducer means coupled to a drive motor for providing an angular position signal.

23. The system of claim 22 wherein said transducer means comprise a potentiometer mounted to rotate with the drive motor shaft.

* * * * *